UNITED STATES PATENT OFFICE.

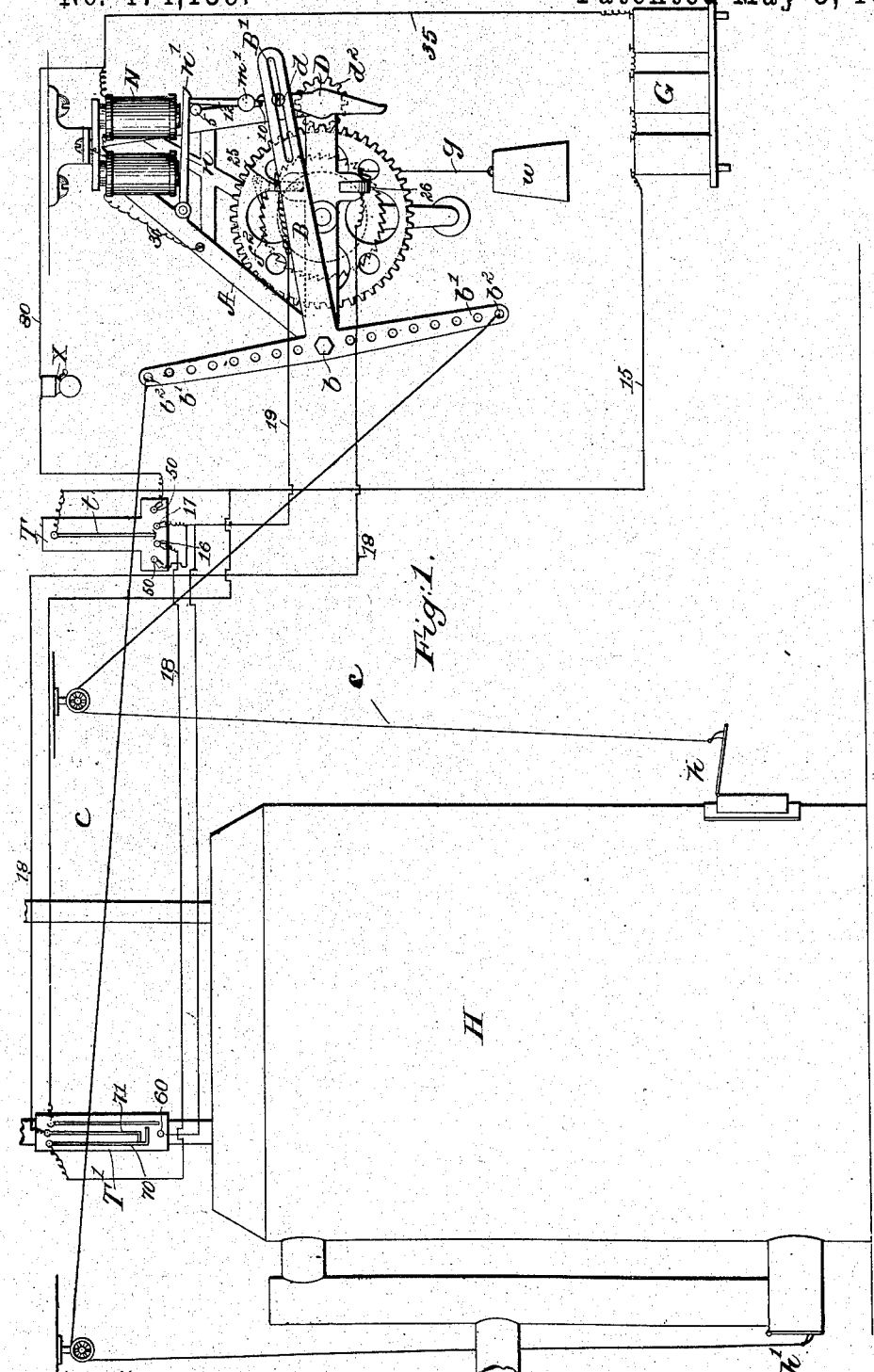

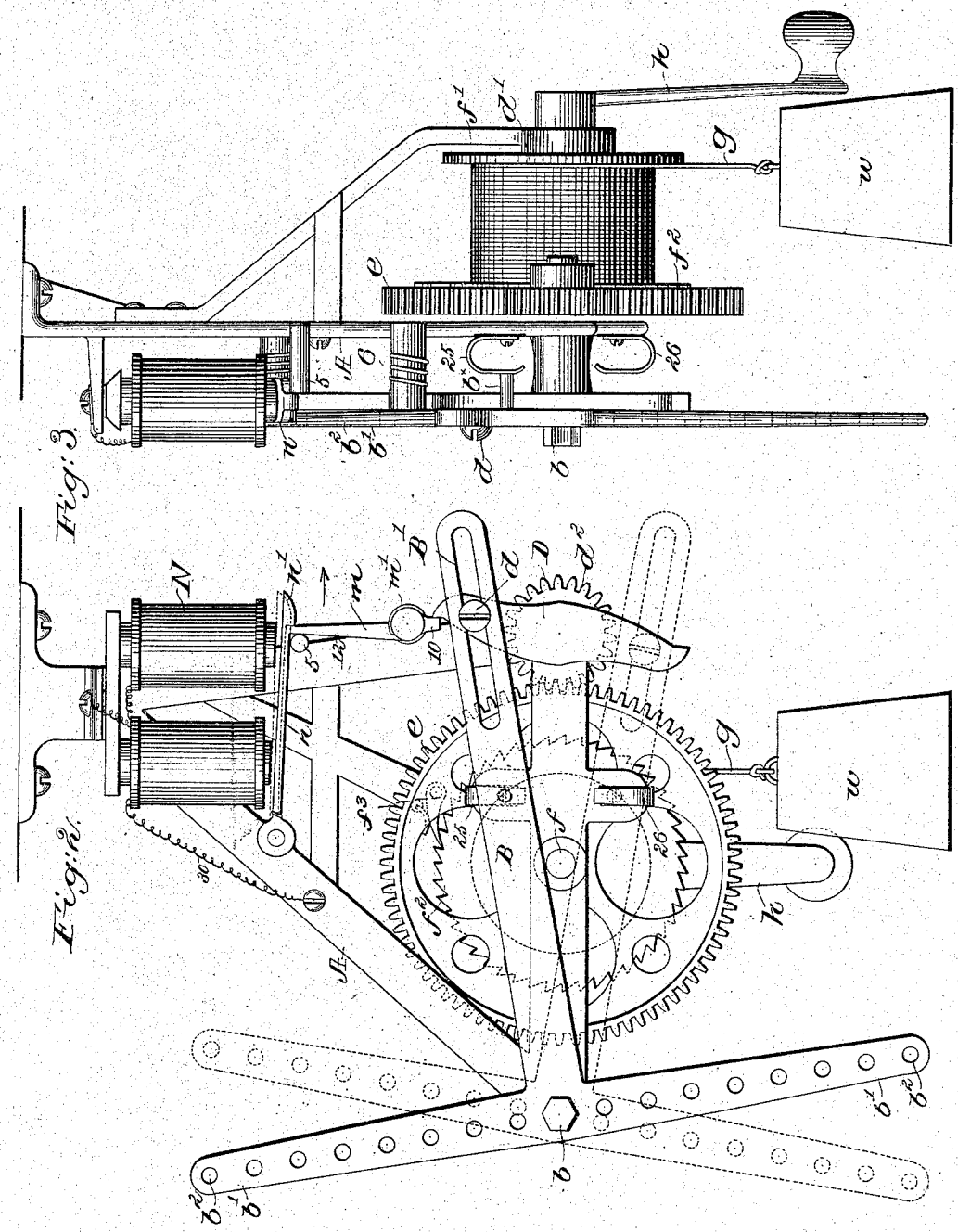

ALFRED B. MORSE, OF EASTON, MASSACHUSETTS.

HEAT-REGULATING DEVICE.

SPECIFICATION forming part of Letters Patent No. 474,139, dated May 3, 1892.

Application filed April 21, 1891. Serial No. 389,804. (No model.)

*To all whom it may concern:*

Be it known that I, ALFRED B. MORSE, of Easton, county of Bristol, State of Massachusetts, have invented an Improvement in Heat-Regulating Devices, of which the following description, in connection with the accompanying drawings, is a specification, like letters and figures on the drawings representing like parts.

This invention has for its object to produce a heat-regulating device simple in its construction and capable of moving large or heavy dampers or regulating-valves and one which shall also be capable of properly controlling the temperature at all times and when necessary obtain the maximum heating effect.

In accordance with this invention a thermostat in the room the temperature of which is to be controlled is placed in circuit with an electro-magnet or solenoid, the armature of which controls the movements of a trip-lever, which is acted upon by a force tending to rotate it, rotation of the trip-lever moving a lever or arm, which moves the dampers or heat-regulating valves. As the heat-regulating mechanism operates to move the dampers or regulating-valves in one direction it automatically sets itself to move them back again in the opposite direction when the thermostat is properly closed for such operation. The thermostat is preferably provided with additional safety-contacts arranged outside of the usual contacts for a purpose to be hereinafter described.

When the regulating device is employed in connection with certain types of heat-generators—such, for instance, as hot-water heaters—an additional thermostat is placed upon or adjacent to the heat-generator in such a manner as to be sensitive to and operated by the temperature of the heating medium and preferably unaffected by the temperature of the external atmosphere. By placing a thermostat in this manner the action of the generator may be checked when the heating medium has reached the temperature at which it can be employed to best advantage for heating effects.

One part of this invention therefore consists of a heater, a thermostat placed in the room to be heated and adapted to respond to changes in the temperature of the room, and a regulating mechanism in circuit with and controlled by said thermostat, combined with a thermostat arranged to respond to the changes in the temperature of the heating medium and also in circuit with and to control said regulating mechanism and when moved to operate said regulating mechanism to cut the thermostat in the said room in or out of circuit, substantially as will be described; also, in a heat-regulator containing the following instrumentalities, viz: a regulating-arm, a trip-lever to move the same and actuating means for the said trip-lever, an electro-magnet, its armature, and a releasing-lever held thereby to control the said trip-lever, to operate substantially as will be described.

Other features of this invention will be hereinafter described, and set forth in the claims.

Figure 1 represents a heat-generator and a heat-regulating device embodying this invention. Fig. 2 on an enlarged scale represents in elevation the regulating mechanism shown in Fig. 1, and Fig. 3 a right-hand end elevation of Fig. 2.

Referring to the drawings, the frame A of the regulating mechanism may be of any suitable shape and construction to sustain the various parts. A regulating lever or arm B, pivoted at $b$ to the frame, has, as herein represented, laterally-extended arms $b'$, each of which is provided with a series of holes $b^2$ or other suitable devices, to which may be attached the cords or chains $c$, Fig. 2, one of which, as represented, leads to and controls the front damper or regulating-valve $h$ of any usual heat-generator H, it being represented as a hot-water heater having circulating-pipes, and the other chain or cord $c'$ leads to and controls the check or cold-air damper $h'$ of the heat-generator.

The regulating lever or arm B at its outer end has a slot B' to receive the stud or screw $d$ on one end of the trip-lever D, herein shown pivoted at its middle on and fast to the shaft $d'$, journaled in the frame, at the opposite side of which the said shaft has fast to it a spur-gear $d^2$, herein represented in mesh with the preferably larger gear $e$, loosely mounted on a shaft $f$, also journaled in the frame. The shaft $f$, provided with a suitable winding-handle, has fast upon it a winding-drum $f'$, provided at its inner end with a series of ratchet-teeth $f^2$, engaged by a spring-controlled pawl $f^3$ on the gear-wheel $e$, a cord $g$ being wound upon the said drum, to the end of which is hung a weight $w$.

The trip-lever D at its upper end bears against the short arm 10 of a releasing-lever $m$, pivoted at $m'$ to the frame, the long arm 12 of the releasing-arm being held against the stop 5 and against the action of a spring 6 by a hook $n'$ on the armature $n$ of an electro-magnet or solenoid N, mounted on the frame, as shown.

The magnet N in the present embodiment of this invention is placed in normally-open circuit with a thermostat T, Fig. 1, which latter is placed in any room the temperature of which it is desired to regulate.

Referring to Fig. 1, the wire 15 leads from one pole of the battery or generator G to the lamina or thermal strip $t$ of the thermostat T, the end of the said lamina moving between the two fixed contacts 16 17, which latter are connected by wires 18 19 with two insulated contact-pens 25 26 on the frame A.

The regulating-arm B has a contact, herein represented as a pin $b^\times$, which when the lever is in one position, as shown, makes electrical contact with the pen 25 and when the lever is in its other dotted-line position makes contact with the pen 26, thus establishing a circuit through the said pens 25 26 and the lever or arm B and the frame A, thence by wire 30 to and through the magnet N, and by wire 35 to the other pole of the battery or generator G.

Assuming the parts to be in the full-line position, Fig. 1, the operation of my improved regulator is as follows: When the temperature in the room in which the thermostat is placed has risen to a predetermined point, the lamina of the thermostat will have expanded sufficiently to contact with the fixed contact 17, closing the circuit through the pin $b^\times$ and pen 25 and the magnet N and attracting the armature $n$ of the magnet. When the armature $n$ of the magnet is attracted, its hook $n'$ is disengaged from the end of the long arm 12 of the releasing-lever $m$, which is immediately moved to one side in the direction of the arrow by the action of the trip-lever D against its short arm 10, permitting the weight $w$, acting through the drum $f'$ and gear-wheels $e$ and $d^2$, to rotate the trip-lever D one-half revolution, or until its opposite end strikes against the short arm of the releasing-lever, which has in the meantime been returned by the spring 6 to its normal position, as shown, and there held by the now retracted armature. The movement of the trip-lever D through one-half a revolution, as described, carries the regulating-arm B to its lowermost dotted-line position, Fig. 2, which will act to close the front damper $h$ of the heater H and open the back damper $h'$ to thus check or retard the action of the heater. As the lever B is moved to its lowermost position, the circuit still being closed by the thermostat and the armature of the magnet N still attracted, the pin $b^\times$ on the said lever is moved off from the pen 25, breaking the circuit at that point and releasing the armature of the magnet, which falls to its retracted position to catch and hold the long arm of the releasing-lever $m$, now returned to its normal position by its spring 6 and ready to receive against it the trip-lever D as it is rotated by the action of the weight. As the regulating-arm B is moved down, the pin $b^\times$ referred to is carried from the pen 25 to the pen 26, completing the circuit by wire 18 at this point in order that when the temperature in the room has dropped to the required point the thermostat, as it contracts in the opposite direction, may close the circuit through the contact 16 and operate the regulator, as before, to move the arm B back again to its uppermost position and change the position of the dampers $h$ and $h'$ to the former position, as shown. Were it not for the arrangement of pens 25 and 26 to co-operate with the pin $b^\times$ on the arm B, the thermostat, having closed the circuit through one of the contacts 16 17, would hold the circuit so closed sometimes for a considerable period of time, or until the temperature had risen or dropped to the required point, and thus run out or drain the battery; but by employing such an arrangement of pens 25 26 and the pin $b^\times$ on the movable arm B one of the circuits only is closed or in operative condition at a time, the open circuit always being the one last employed to operate the regulator. Thus when the regulator is operated over one wire, as 19, to check the heater, the continuity of the circuit over that wire 19 is immediately broken at the pen 25 and the continuity of the circuit by wire 18 is established at the pen 26, which circuit is then in condition to be operated upon when the temperature has fallen to the required point, and whether the thermal strip of the thermostat remains in contact with either of the contacts 16 17 or not it cannot operate to drain the battery G, for the reason that the continuity of the circuit through that particular contact is always broken at its pen 25 or 26. Again, the movements of the parts are so timed with relation to each other that the trip-lever D shall clear the releasing-lever $m$ and permit it to be returned by the spring 6 to its normal position against the stop 5 before the circuit is broken by the movement of the pin $b^\times$ off from the pen 25 or 26 with which it was in contact, thus holding the armature in its attracted position until the releasing-lever has been returned to its normal position, when the circuit, being then broken by the pin $b^\times$ moving from its pen, drops the hook $n'$ of the armature down over the end of the releasing-lever to hold it in place. The releasing-lever therefore is not compelled on its return movement to lift the armature in order to get behind the hook $n'$, for the hook is held clear of it by the magnet until it is so returned, making it possible to employ a very light spring 6.

While a weight sufficiently heavy to operate any damper or valve may be hung from the drum $f'$, still the let-off or releasing mechanism is such that a comparatively small magnet N and a light battery will operate the same.

The cords or chains $c$ operating the dampers may be attached to the arms $b'$ at such holes or points as will give the required movements to the dampers one with relation to the other.

While I preferably employ a weight $w$, still a suitable spring may be employed to rotate the shaft $d'$ and trip-lever D, and, if desired, the actuating power or force may be applied directly to the shaft $d'$.

The arm B may be employed to move a steam or other valve instead of the damper shown, and the cords or connections $c$ may be attached directly to the arm B.

The thermostat T is herein represented as provided with additional safety-contacts 50 beyond or outside of the contacts 16 17, so that if the temperature in the particular room in which the thermostat is placed should by some other or outside means be caused to drop to a considerable degree beyond the limit as fixed by the regular contact 16, the remainder of the house being at the proper temperature, the thermal strip or contact-arm $t$ will continue to move beyond the contact 16 and contact with the safety-contact 50, which is also in circuit, as shown, to operate to reverse the dampers from the position in which they were left by the last action of the contact 16 adjacent to it to their former condition.

If, for instance, when the house as a whole is at the desired temperature a window in a closed room in which the thermostat is placed should be thrown open, the temperature in that room only would drop until the thermostat should close the circuit through the contact 16 and open the dampers, which would act to throw still more heat into the already properly heated house, which would heat it to an excessive temperature, and still without raising the temperature in the particular room in which the thermostat is placed, owing to the open window, which keeps the temperature down. To obviate such a condition of affairs, the safety-contact 50 is provided, so that when the low temperature in a particular room causes the thermal strip or contact-arm to move beyond the regular contact, as mentioned in the above case, it will contact with the safety-contact at that side which is herein shown as in circuit with the opposite regular contact 17 and will operate to reverse the action of the regulating device caused by the contact with the regular contact 16 adjacent to it and again close the dampers to preserve the former or desired temperature in the house as a whole irrespective of the particular room in which the thermostat may be placed.

If desired, a bell or other alarm may be placed in circuit with the safety-contacts.

I have herein represented an additional thermostat T' placed upon or adjacent to the heat-generator H, which in this instance is a hot-water heater, hot water being the heating medium.

It is well known that as soon as steam begins to form it will interfere with the circulation of the hot water in the heating-pipes. Therefore it is desirable to maintain the temperature of the water at the highest possible point in order to obtain the greatest heating effect and still prevent the formation of steam. To secure this result, the thermostat T' is so placed that its thermal strip or lamina will be affected by the water or heating medium, which when it reaches the highest temperature for heating effects, but before the beginning of formation of steam, will cause the lamina to expand sufficiently to close the circuit through the lamina and contact 60, which latter is tapped into the line 19, in circuit with the contact 17 of the thermostat T, which contact will cause the regulating mechanism to operate to close the dampers of the heater.

In moving to close the circuit through the contact 60 the lamina of the thermostat T' just previous to closing the circuit through the said contact will separate the pens 70 71 in the line 18 and break the line 18 at that point, thus rendering the contact 16, with which the lamina $t$ is in contact to obtain more heat, inoperative to avoid immediately opening the dampers again through the lamina $t$ and contact 16 of the thermostat T when they have been closed by the thermostat T'. When the temperature of the water or heating medium has dropped to the point where the maximum heating effect may be produced without danger of forming steam, then and not until then will the thermostat T' operate to break the circuit through its contact 60 and also restore the continuity of the circuit through the line 18 to place the regulating mechanism and the heater once more under the control of the thermostat T. The heater is thus under the exclusive control of the thermostat in the room to be heated, unless the water should be heated to the steam-point, when the safety-thermostat T' will operate to prevent the formation of steam, which would injure the heating effect of the water.

If the temperature of the room should rise and the thermostat T should move to close the circuit through the contact 17 and the regulating mechanism should fail to operate to close the dampers, the continued rising of the temperature would cause the lamina $t$ to further expand and move beyond the contact 17 to the safety-contact 50 beyond it and close the circuit through said safety-contact and branch line 80 to ring a bell X or other alarm device to notify the attendant that the regulating mechanism has failed to operate.

Both safety-contacts 50 may, if desired, be connected to act in opposition to their adjacent regular contacts instead of one, as now shown.

I do not herein claim, broadly, a thermostat having additional safety-contacts, as such a thermostat forms the subject-matter of another application to be filed by me.

This invention is not limited to the particular arrangement and construction shown, as the same may be varied without departing from the scope of the invention.

I claim—

1. In a heat-regulating device, the combination, with a regulating mechanism, of a thermostat, the contact-arm of which normally moves between two contacts in circuit with and to control said regulating mechanism, and the safety-contact 50, also in circuit with said regulating mechanism, to operate substantially as described.

2. A heat-regulator containing the following instrumentalities, viz: a regulating-arm, a trip-lever to move the same and actuating means for the said trip-lever, an electro-magnet, its armature, and a releasing-lever held thereby to control the said trip-lever, to operate substantially as described.

3. A heat-regulator containing the following instrumentalities, viz: a regulating-arm, a trip-lever pivoted at its middle and mechanism to rotate the same, and a connection between said trip-lever and regulating-arm, whereby rotation of the former will move the latter, a releasing-lever acted upon by one end of the trip-lever, and an electro-magnet and its armature to control the releasing-lever, to operate substantially as described.

4. A heat-regulator containing the following instrumentalities, viz: a frame, a shaft journaled therein and mechanism to rotate the same, a trip-lever mounted at its middle on said shaft, a regulating-arm pivoted to the frame and connected to and moved by one end of the said trip-lever, a pivoted releasing-lever acted upon by one end of the trip-lever, and a magnet and its armature to control the said releasing-lever, substantially as described.

5. A frame, a regulating-lever pivoted at one end thereto and having a slot at its free end, combined with a shaft journaled in said frame and mechanism to rotate it, a trip-lever D, fast to said shaft and connected with the free end of the said regulating-lever by a stud located in the said slot, and an electro-magnet, its armature, and mechanism controlled thereby to hold said trip-lever, to operate substantially as described.

6. A frame, a regulating-lever pivoted at one end thereto and having a slot at its free end, combined with a shaft journaled in the said frame and mechanism to rotate the same, a trip-lever D, fast to said shaft, and a stud $d$ in the said slot and carried by one end of the said trip-lever, the releasing-lever $m$, pivoted at $m'$, and an electro-magnet and its armature $n$, provided with a hook $n'$, to operate substantially as described.

7. A frame, a regulating-lever B, pivoted at $b$ and having arms $b'$, provided with a series of holes $b^2$, and a slot B in the free end of the said regulating-lever, combined with a shaft journaled in said frame and mechanism to rotate it, a trip-lever D, fast to said shaft and connected with the free end of the said regulating-lever by a stud located in the said slot, and an electro-magnet, its armature, and mechanism controlled thereby to hold said trip-lever, to operate substantially as described.

8. A frame, a regulating-lever movable thereon, an electro-magnet, its armature, and mechanism controlled thereby to move the said regulating-arm, combined with two contacts insulated from said frame, one of which is in contact with the said regulating-arm at a time, and a thermostat having three fixed contacts electrically connected with said insulated contacts, substantially as and for the purpose specified.

9. A heater, a thermostat placed in the room to be heated and adapted to respond to changes in the temperature of the room, and a regulating mechanism in circuit with and controlled by said thermostat, combined with a thermostat arranged to respond to the changes in the temperature of the heating medium and also in circuit with and to control said regulating mechanism and when moved to operate said mechanism to cut the thermostat in said room in or out of circuit, substantially as described.

10. In a heat-regulating device, a regulating mechanism and a thermostat T, having two contacts connected by wires 18 19 with and to control said regulating mechanism, combined with a thermostat T', connected in circuit to operate in connection with the wire 19 of the thermostat T, and the pens 70 71, placed in the line 18 and adapted to be separated by operation of the thermostat T' to direct the circuit of the thermostat T through the wire 18, substantially as described.

11. In a heat-regulating device, a heater and a regulating mechanism to control the same, combined with a thermostat having a contact-arm, a contact arranged at one side of said contact-arm to co-operate therewith and arranged in circuit with and to operate said regulating mechanism, and a second contact arranged beyond said first contact and in circuit with said regulating mechanism, closure of the circuit through the said second contact acting to operate the said regulating mechanism to reverse the effect caused by the operation of the said mechanism by closure with the first of the said contacts, substantially as described.

In testimony whereof I have signed my name to this specification in the presence of two subscribing witnesses.

ALFRED B. MORSE.

Witnesses:
BERNICE J. NOYES,
EDWARD F. ALLEN.